United States Patent [19]

Smith et al.

[11] 4,455,643

[45] Jun. 19, 1984

[54] HIGH SPEED OPTICAL SWITCH AND TIME DIVISION OPTICAL DEMULTIPLEXER USING A CONTROL BEAM AT A LINEAR/NONLINEAR INTERFACE

[75] Inventors: Peter W. Smith, Colts Neck; Walter J. Tomlinson, III, Holmdel, both of N.J.

[73] Assignee: Bell Telephone Laboratories, Incorporated, Murray Hill, N.J.

[21] Appl. No.: 364,996

[22] Filed: Apr. 2, 1982

[51] Int. Cl.³ ........................ G02B 27/10; H04B 9/00
[52] U.S. Cl. ............................................ 370/4; 370/2
[58] Field of Search ............... 350/359, 363, 353, 354, 350/96.13, 96.14; 370/4, 2

[56] References Cited

U.S. PATENT DOCUMENTS

| | | | |
|---|---|---|---|
| 3,633,034 | 1/1969 | Uchida | 370/3 |
| 3,652,858 | 3/1972 | Kinsel | 370/4 |
| 3,670,165 | 6/1972 | Kinsel | 307/2 |
| 3,671,747 | 6/1972 | Duguay | 370/2 |
| 4,121,884 | 10/1978 | Greenwood | 350/96.15 |
| 4,190,811 | 2/1980 | Alcock | 331/94.5 |
| 4,244,045 | 1/1981 | Nosu | 370/3 |

OTHER PUBLICATIONS

Kaplan, A. E., "Hysteresis Reflection and Refraction by a Nonlinear Boundary-A New Class of Effects in Nonlinear Optics", Jul. 5, 1976, pp. 114–119.
Kaplan, A. E., "Theory of Hysteresis Reflection of Light by a Boundary of a Nonlinear Medium", May, 1977, pp. 896–905.
Smith, P. W., "Optical Bistability at a Nonlinear Interface", pp. 846–848, Dec. 1, 1979.
Tomlinson, W. J., "Surface Wave at a Nonlinear Interface", Jul. 1980, pp. 323–325.

*Primary Examiner*—Joseph A. Orsino, Jr.
*Assistant Examiner*—Timothy K. Greer
*Attorney, Agent, or Firm*—Erwin W. Pfeifle

[57] ABSTRACT

The present invention relates to a high speed optical switch and the use of such switches to form a time division demultiplexer. The optical switch comprises a length of linear material (12) including an outer surface on a portion of which is formed a layer of nonlinear material (11) to form a nonlinear interface (10) at the boundary of the two materials. An input data light beam (14) is propagated in the linear material with a predetermined intensity and angle of incidence on the nonlinear interface to, by itself, cause total reflection of the input beam. A control light beam (11) is also selectively energized and directed at the nonlinear interface with an intensity and angle of incidence to cause a portion of the input data beam to be formed into a self-focused channel or beam propagating in the nonlinear material. The self-focused beam can then be detected at an edge of the nonlinear material.

10 Claims, 5 Drawing Figures

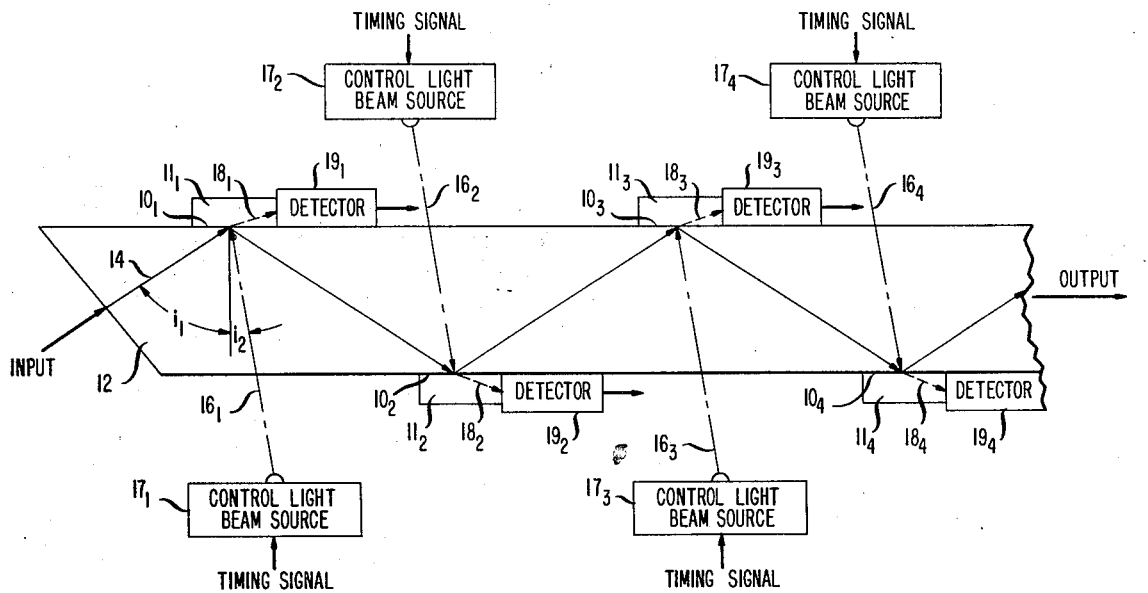

HIGH SPEED OPTICAL SWITCH AND TIME DIVISION OPTICAL DEMULTIPLEXER USING A CONTROL BEAM AT A LINEAR/NONLINEAR INTERFACE

BACKGROUND OF THE INVENTION

1. Field of the Invention

The present invention relates to a high speed optical switch and the use of such switch to form a time division optical demultiplexer and, more particularly, to a high speed optical switch comprising a layer of nonlinear material and a layer of linear material forming a nonlinear interface at the boundary of the two materials, and a selectively energizable control light beam directed at the nonlinear interface. An input data beam propagating in the linear material with a predetermined intensity and angle of incidence when impinging the nonlinear interface is totally reflected in the absence of the control light beam and a portion thereof is formed into a self-focused beam in the nonlinear material in the presence of the control light beam. Multiple switches can be arranged in sequence to form a time division optical demultiplexer.

2. Description of the Prior Art

Optical switching devices have been of considerable interest for use in laser and optical communication systems to enable light beams to be switched along various paths and for performing multiplexing and demultiplexing function. An optical switching device is disclosed in U.S. Pat. No. 4,190,811 issued to A. J. Alcock et al on Feb. 26, 1980. There, apparatus is described wherein a signal beam from a first laser is directed at a surface of a semiconductor at Brewster's angle and is transmitted through the semiconductor to a first utilization device. A control beam of sufficiently high intensity from a second laser is also selectively directed at the semiconductor surface and when such control beam is present, free carriers are created in the semiconductor to cause total reflection of the signal beam.

The article "Optical Bistability at a Nonlinear Interface" by P. W. Smith et al in *Applied Physics Letters*, Vol. 35, No. 11, Dec. 1, 1979 at pages 846-848 describes an optical element based on the intensity dependent reflectivity of an interface between a linear and a nonlinear medium. A low intensity beam with an angle of incidence less than the critical angle is directed at the interface and is totally reflected. However, at some threshold input intensity a sudden switch in state occurs to produce both a reflected beam portion and a beam portion which is transmitted in the nonlinear medium.

The article "Surface Wave at a Nonlinear Interface" by W. J. Tomlinson in *Optics Letters*, Vol. 5, No. 7, July 1980 at pages 323-325 discloses that a nonlinear interface is intensity sensitive and it is possible to excite a surface wave that propagates along the interface with a constant shape and intensity for possible detection at the edge of the interface.

U.S. Pat. No. 4,244,145 issued to K. Nosu et al on Jan. 6, 1981 discloses a wavelength division optical multiplexer and demultiplexer wherein each of one or more optical filters are used to pass a predetermined separate bandwidth of a wider band multiplexed signal and reflect all other frequencies.

The problem remaining in the prior art is to provide a high speed switch which can operate with sub-picosecond switching times that is easy to construct and capable of being used to form a time division optical demultiplexer.

SUMMARY OF THE INVENTION

The foregoing problem has been solved by the present invention which relates to a high speed optical switch and the use of such switch to form a time division optical demultiplexer and, more particularly, to a high speed optical switch comprising a layer of nonlinear material and layer of linear material forming a nonlinear interface at the boundary of the two materials, and a selectively energizable control light beam directed at the nonlinear interface. An input data beam propagating in the linear material with a predetermined intensity and angle of incidence when impinging the nonlinear interface is totally reflected in the absence of the control light beam and a portion thereof is formed into a self-focused beam in the nonlinear material in the presence of the control light beam.

It is an aspect of the present invention to provide an optical switching device which is capable of sub-picosecond switching times that comprises a nonlinear interface on which is directed a data light beam having a predetermined intensity and angle of incidence which by itself is totally reflected back into a linear material at the nonlinear interface, and a control light beam which, when selectively energized and directed through the linear material and onto the nonlinear interface with a predetermined intensity, beamwidth and angle of incidence, causes a portion of the data light beam to form a self-focused beam in a nonlinear material at the nonlinear interface.

It is a further aspect of the present invention to provide an optical time division demultiplexer comprising a length of a linear material having an outer surface on which is disposed a separate layer of a nonlinear material forming a nonlinear interface at the boundary of the two materials at predetermined spaced-apart locations along the longitudinal axis thereof. A separate selectively energizable control light beam is directed onto each of the nonlinear interfaces with each control light beam having a predetermined intensity, width and angle of incidence for causing a data beam propagating in the linear material and impinging each of the nonlinear interfaces with a predetermined intensity and angle of incidence to be totally reflected in the absence of the control light beam and to be partially directed to form a self-focused beam in the layer of nonlinear material in the presence of the control light beam.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

A nonlinear interface has been described as an interface or boundary between two transparent dielectric materials where one is a layer of a linear material and the other is a layer of a nonlinear material which has a light intensity-dependent refractive index also defined as an optical Kerr effect. More particularly, a nonlinear interface was described by A. E. Kaplan in the articles "Hysteresis Reflection and Refraction by a Nonlinear Boundary—A New Class of Effects in Nonlinear Optics" in JETP Letters, Vol. 24, No. 1, July 5, 1976 at pages 114-119, "Theory of Hysteresis Reflection and Refraction of Light by a Boundary of a Nonlinear Medium" in *Soviet Physics—JETP*, Vol. 45, No. 5, May 1979 at pages 896-905, wherein the linear material is defined as comprising a refractive index $N_0$ and the nonlinear material comprises a refractive index $n_1 = n_0 + \Delta n_l + \Delta n_{nl}$, where $\Delta n_{nl} = n_2 I$, I being the intensity in the nonlinear material and $\Delta n_l$ is a field-independent increment to the dielectric constant. It is also known that under appropriate conditions, a beam incident on such interface will be totally reflected if its intensity is below a threshold value, and that for intensities above the threshold value a significant portion of the beam is transmitted into the nonlinear medium where it propagates in the form of a self-focused channel.

In accordance with the present invention, it has been found that the generation of a self-focused beam in the nonlinear material forming a nonlinear interface can be controlled by a control light beam with an intensity and power that are both lower than the intensity and power of the data light beam being controlled. More particularly, it has been found that a data light beam propagating in a linear medium and impinging a nonlinear interface with an intensity below the threshold value for partial transfer into the nonlinear material can be made to couple power into a self-focused beam in the nonlinear material if the nonlinear interface is also illuminated by a separate light control beam.

Figure 1:
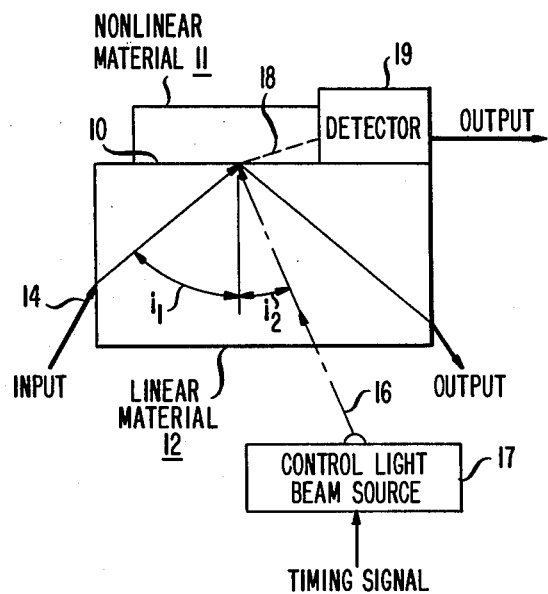
FIG. 1 illustrates a high speed optical switching device including a nonlinear interface in accordance with the present invention.

FIG. 1 illustrates a high speed optical switching device in accordance with the present invention where a nonlinear interface 10 is formed at the boundary between a layer of a nonlinear material 11 and a layer of a linear material 12. A data light beam, designated by a ray 14, propagating in linear material 12 impinges nonlinear interface 10 with an angle of incidence $i_1$ and an intensity below a predetermined threshold level. Therefore, by itself, data beam 14 will be totally reflected and continue to propagate in linear material 12 to the output thereof. However, in the presence of a control light beam 16 radiated from a selectively energizable control light beam source 17, that was enabled by a timing signal, in a direction to impinge nonlinear interface 10 with an angle of incidence $i_2$ and a predetermined sufficient intensity, the data beam is caused to penetrate into the nonlinear medium. Therefore, in the presence of a selectively energized control light beam 16, a portion of the data beam 14 will be coupled into a self-focused beam 18 that propagates down the layer of nonlinear material 11 while any remaining portion will be reflected for continued propagation in linear material 12.

The self-focused beam 18 can then be directed down any desired path or, as shown in FIG. 1, can be detected by a detector 19 for conversion to an electrical signal at the output thereof.

Figure 2:
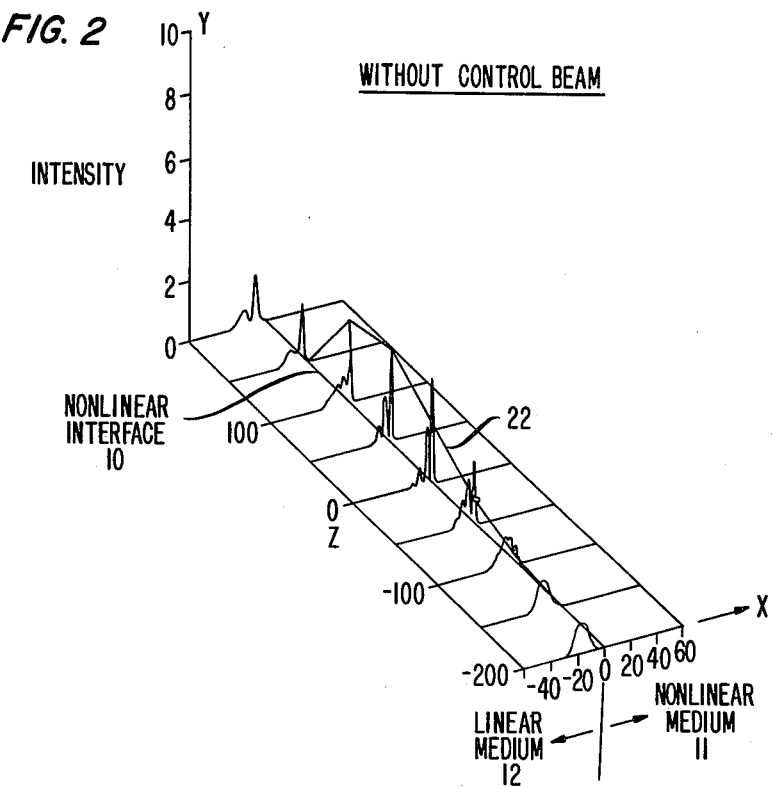
FIG. 2 illustrates a typical perspective plot of the intensity distribution produced for a specific set of parameters in the absence of a control beam in the arrangement of FIG. 1.
Figure 3:
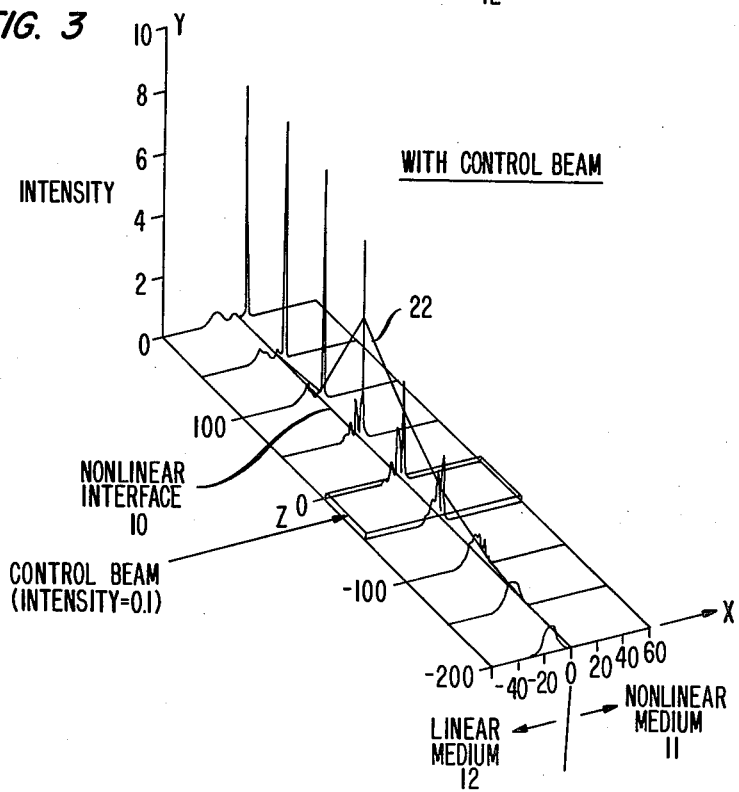
FIG. 3 illustrates a typical perspective plot similar to that of FIG. 2 in the presence of a control beam.

Typical perspective plots of the intensity distributions produced at the nonlinear interface 10 of FIG. 1 for specific parameters are shown in FIGS. 2 and 3 for the absence and the presence of a control beam 16, respectively. These plots show the results of two-dimensional numerical simulations using the techniques described in the article "Reflection of a Gaussian Beam at a Nonlinear Interface" by W. J. Tomlinson et al in *Applied Optics*, Vol. 21, No. 11, June 1, 1982. Specific parameters for producing the simulated plots of FIGS. 2 and 3 comprise: (a) a linear medium 12 with a refractive index $n_0 = 1.5$; (b) a nonlinear medium 11 with a refractive index $n = n_0 + 0.02 + 0.0109I$ where I is the intensity of the light in the nonlinear medium; (c) an input two-dimensional beam having a power of 12.6 units, a Gaussian beam radius of $10\lambda$, a peak intensity of unity and an angle of incidence $i_1$ on the nonlinear interface 10 of 85 degrees; and (d) a control beam 16 comprising a uniform intensity of 0.1 units, a width of 50 wavelengths, aligned such that it intersects the nonlinear interface along the Z-axis from $Z = -50$ to 0 wavelengths where zero wavelength is the point on the interface 10 where the axis of the input beam intersects it, and a power of 5 units at an angle of incidence $i_2$ normal to the nonlinear interface 10. A resultatnt self-focused beam 18 is produced in the presence of control beam 16 comprising a power of 7 units which propagates at an angle to the nonlinear interface 10 of approximately 88.8 degrees.

In FIGS. 2 and 3, the Z and X axes represent distances along and away from the nonlinear interface 10, respectively, in units of wavelength of the light. It is to be understood that the scale along the Z axis has been expanded over that along the X axis for purposes of clarity. The dimensions along the Y axis represent arbitrary units of intensity. In FIG. 2, there is shown the intensity of the input data beam 14 as it propagates along the nonlinear interface 10 at an angle of incidence of 85 degrees from a point 200 wavelengths before to a point 200 wavelengths after the point (O) where the axis of the beam 14 intersects the nonlinear interface along the Z axis in the absence of a control beam 16. The line 22 is provided to show the intensity of the light along the nonlinear interface 10 and it can be noted that any light which may be introduced into the nonlinear meduim 11 by a very short distance is actually bent back into the linear medium 12 so that the data beam 14 is totally reflected back into said linear medium.

FIG. 3 illustrates the same data beam 14 as it propagates along nonlinear interface 10 as shown in FIG. 2, but in the presence of a control beam 16 normal to the interface 10 with an intensity of 0.1 units in the area of $Z = -50$ to 0 wavelengths. Again, line 22 shows the light intensity along nonlinear interface 10 and it can be seen that in the presence of a low intensity control beam 16 a threshold level is passed and most of data beam 14 is transformed into a self-focused beam 18 in nonlinear medium 11. It is to be understood that the plots of FIGS. 2 and 3 are for specific parameters recited hereinbefore and that other parameters could be used to achieve similar results in the switching means of FIG. 1. For example, data beam 14 could comprise a lower peak intensity or different angle of incidence with interface 10 and, in turn, control beam 16 could comprise a higher intensity or different angle of incidence for the combination of beams to generate a self-focused beam 18 in the nonlinear medium. There are not currently available simple analytical expressions from which one can calculate the required characteristics of the control beam to cause switching of a given input beam. However, with the numerical simulation techniques used to obtain FIGS. 2 and 3, it is possible to calculate the behavior for any given control beam. It should be obvious to those skilled in the art that by carrying out such calculations for various control beam parameters, one can determine the optimum control beam for any given input beam.

Figure 5:
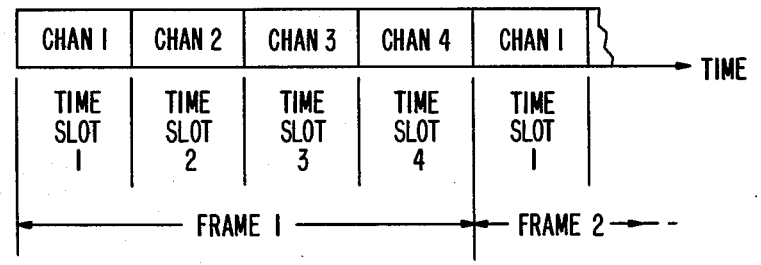
FIG. 5 illustrates a typical time division multiplexed signal for four channels for use with the arrangement of FIG. 4.
Figure 4:
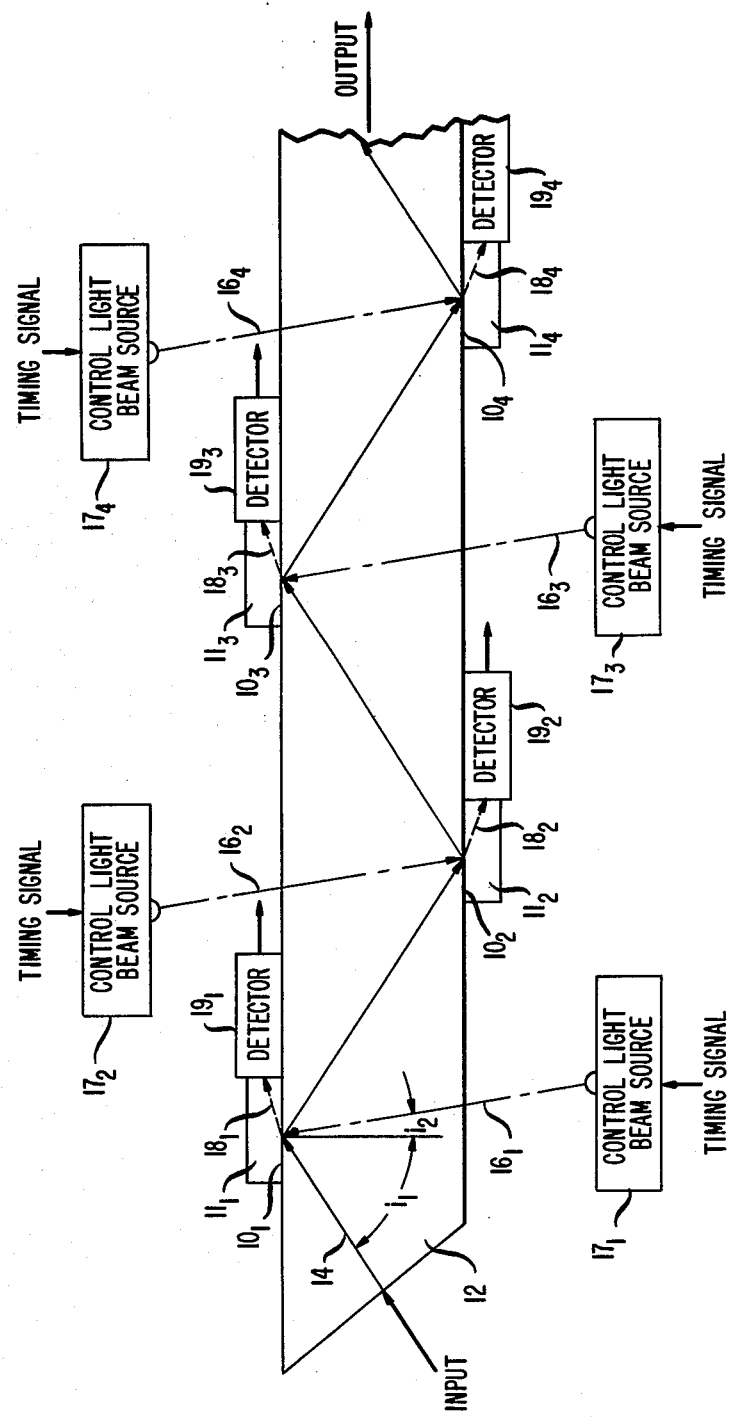
FIG. 4 illustrates a high speed optical time division demultiplexer in accordance with the present invention.

An optical time division demultiplexer in accordance with the present invention, using the switching means of FIG. 1, is shown in FIG. 4. There, an input data light beam 14 is directed into a length of linear material 12 in a predetermined manner to propagate therein with a predetermined intensity below a predetermined threshold value and to impinge the boundary thereof at a predetermined angle of incidence $i_1$ along the length of the linear material. The input data signal 14 for use with the demultiplexer of FIG. 4, in the preferred embodiment, is a time division multiplexed signal wherein separate channels are interleaved in time as shown in FIG. 5 for the special case of four time division multiplexed channels. Such type signal is well known in the art and essentially comprises N channels, i.e., N=4, which are transmitted in a predetermined sequence during a frame period, which sequence is generally repeated in a similar manner in subsequent sequential frame periods.

In the arrangement of FIG. 4, a series of four nonlinear interfaces $10_1$–$10_4$, similar to the one of FIG. 1, are formed along the surface of the length of a linear material 12 by forming four separate layer sections of nonlinear material $11_1$–$11_4$ at predetermined locations. A separate control light beam source $17_1$–$17_4$ is directed at a separate associated one of the nonlinear interfaces $10_1$–$10_4$ for selectively providing a separate control light beam $16_1$–$16_4$ during the time when a predetermined time slot signal representative of the desired channel in data beam 14 is impinging the associated nonlinear interface. A separate detector $19_1$–$19_4$ is provided at the output of the associated layer of the nonlinear material $11_1$–$11_4$ for detecting the presence of a self-focused beam including the desired channel signal and generating an electrical output signal representative of such channel signal.

If it is assumed that input data signal 14 is in the form of a time division multiplexed signal of FIG. 5 and that the elements of nonlinear interfaces $10_1$–$10_4$ are to receive channels 1–4, respectively, then the demultiplexing arrangement of FIG. 4 will typically operate in the following manner. With regard to nonlinear interface $10_1$, input data beam 14 is incident thereon during each of time slot intervals 1–4 of each frame interval. However, since it is desired to receive only channel 1 with the elements associated with nonlinear interface $10_1$, a control light beam source $17_1$ is energized, with a timing signal that is synchronized with the input data stream 14, to form a control light beam $16_1$ pulse over the time period when the input data signal of channel 1 is incident on nonlinear interface $10_1$. During the period of time slot 1 when the signal of channel 1 is incident on nonlinear interface $10_1$ concurrent with control light beam $16_1$, a self-focused beam $18_1$, comprising the signal in channel 1, will propagate in nonlinear material $11_1$ and be detected by light detector $19_1$. Since nonlinear interface $10_1$ is to receive only the channel 1 signal, control light beam source $17_1$ will not be energized during the periods of each frame interval when the signals in channels 2–4 in input data beam 14 are incident on nonlinear interface $10_1$ so that input data beam 14 will be totally reflected back into linear material 12 to propagate towards nonlinear interfaces $10_2$–$10_4$. In a similar manner, control light beam sources $17_2$–$17_4$ will be selectively energized during the intervals when the signals in channels 2–4, respectively, are incident on the respective nonlinear interfaces $10_2$–$10_4$. As a result, each of channels 1–4 are received by separate detectors $19_1$–$19_4$, respectively, by the selective energizing of control light beam sources $17_1$–$17_4$ in the arrangement of FIG. 4.

It is to be understood that the above-described embodiments are simply illustrative of the principles of the invention. Various other modifications and changes may be made by those skilled in the art which will embody the principles of the invention and fall within the spirit and scope thereof. More particularly, it is to be understood that the control light beam pulses 16 in FIGS. 1 and 4 need not be of the same wavelength as the signals in input data beam 14 and, therefore, the control light beam signals can easily be separated from the input data channel signals by any suitable filtering means. It is to be further understood that the arrangement of FIG. 4 is presented for exemplary purposes only and not for purposes of limitation since channels 1–4 of FIG. 5 could be received in a similar manner by other ones of detectors $19_1$–$19_4$ or more than one channel could be received at a detector by the proper energizing of an associated control light beam source.

What is claimed is:

1. A high speed optical switching means comprising:
   a length of a transparent linear dielectric medium including an outer surface and a predetermined index of refraction which is capable of propagating a first beam of light:
   a layer of a transparent nonlinear dielectric medium which exhibits an optical Kerr effect, said layer being formed on a portion of the outer surface of the length of a linear medium to provide a nonlinear interface at the boundary of said linear and nonlinear media, the nonlinear interface being capable of totally reflecting a first light beam propagating in the linear medium at less than a critical angle of incidence and a light intensity on the nonlinear interface which is below a predetermined threshold level; and
   a selectively energizable light source for producing a second light beam which is directed at the nonlinear interface during selected intervals of time, which second light beam is disposed at a sufficient angle of incidence, width and light intensity at the nonlinear interface for causing a portion of the first light beam which is incident on the nonlinear interface concurrent with the second light beam to be transformed into a self-focused beam propagating in the layer of a nonlinear medium.

2. A high speed optical switching means according to claim 1 wherein the first light beam comprises a time division multiplexed signal including a plurality of separate channel information signals transmitted in a plurality of separate sequential time slot intervals of a frame period, said selectively energizable light source is selectively energized during a time when a predetermined at least one of the plurality of channel information signals is incident on the nonlinear interface.

3. A high speed optical switching means according to claim 2 wherein the switching means further comprises:
   a second layer of a transparent nonlinear dielectric medium which exhibits an optical Kerr effect, said second layer being formed on a second portion of the outer surface of the length of a linear medium and producing a second nonlinear interface at the boundary of the linear and the second nonlinear mediums, the second nonlinear interface being capable of totally reflecting a first light beam propagating in the linear medium which has a critical angle of incidence and a light intensity on the nonlinear interface which is below the predetermined threshold level; and
   a second selectively energizable light source for producing a separate second light beam which is directed at the second nonlinear interface during selected intervals of time when a seperate second predetermined at least one of the plurality of channel information signals is incident on the second nonlinear interface, which separate second light beam comprises a sufficient angle of incidence, width and light intensity at the second nonlinear interface for causing a portion of the first light beam which is incident on the second nonlinear interface concurrent with the separate second light beam to be transformed into a second self-focused beam propagating in the second layer of a nonlinear medium.

4. A high speed optical switching means according to claim 1, 2 or 3 wherein the switching means further comprises a separate light detecting means disposed at the end of each layer of a nonlinear medium for detecting a self-focused beam propagating in each layer of a nonlinear medium.

5. A high speed optical switching means according to claims 1, 2 or 3 wherein the first light beam and the second light beam comprise signals of the same wavelength.

6. A high speed optical switching means according to claims 1, 2 or 3 wherein the first light beam and the second light beam comprise signals of a different wavelength.

7. A high speed optical demultiplexer for separating time division multiplexed signals including a plurality of separate data signals transmitted in a plurality of separate sequential time slot intervals of a frame period, the demultiplexer comprising:
   a length of a transparent linear dielectric medium including an outer surface and a predetermined index of refraction which is capable of propagating a beam of light including a plurality of separate data signals therein;
   a plurality of layers of a transparent nonlinear dielectric medium which exhibit an optical Kerr effect, each of said layers being formed on a separate portion of the outer surface of the length of a linear medium to provide a separate nonlinear interface at the boundary of said linear and nonlinear media, each nonlinear interface being capable of totally reflecting a data light beam propagating in the linear medium at less than a critical angle of incidence and a light intensity on each nonlinear interface which is below a predetermined threshold level; and
   a plurality of selectively energizable light sources for producing separate control light beams which are each directed through the linear medium and at a separate one of the plurality of nonlinear interfaces, each control light beam being selectively energized during a time when a separate desired one of the plurality of data signals in the time division multiplexed signal is incident on the nonlinear interface associated with said control light beam, which control light beams each are disposed at a sufficient angle of incidence, width and light intensity at the associated nonlinear interface for causing a portion of the data light beam signal including a desired one of the data signals which is incident on the associated nonlinear interface, concurrent with the control light beam, to be transformed into a self-focused beam propagating in the associated layer of a nonlinear medium.

8. A high speed optical demultiplexer according to claim 7 wherein the demultiplexer further comprises a plurality of light detecting means, each light detecting means being disposed at the end of a separate one of the plurality of layers of a nonlinear medium for detecting a self-focused beam propagating in an associated layer of a nonlinear medium.

9. A high speed optical demultiplexer according to claim 7 wherein the data light beam and each of the plurality of control light beams comprise signals of the same wavelength.

10. A high speed optical demultiplexer according to claim 7 wherein the data light beam and the plurality of control light beam comprise signals of different wavelengths.

* * * * *